US012625626B2

(12) United States Patent
Wang et al.

(10) Patent No.: US 12,625,626 B2
(45) Date of Patent: May 12, 2026

(54) ADAPTIVE COMPRESSION FOR ACCELERATOR DEVICES

(71) Applicant: Intel Corporation, Santa Clara, CA (US)

(72) Inventors: Fei Wang, Clare (IE); John Browne, Limerick (IE); Laurent Coquerel, Limerick (IE)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/865,594

(22) Filed: Jul. 15, 2022

(65) Prior Publication Data

US 2022/0391110 A1     Dec. 8, 2022

(51) Int. Cl.
*G06F 3/06* (2006.01)
(52) U.S. Cl.
CPC .......... *G06F 3/0626* (2013.01); *G06F 3/0644* (2013.01); *G06F 3/0673* (2013.01)
(58) Field of Classification Search
None
See application file for complete search history.

(56) References Cited

U.S. PATENT DOCUMENTS

| | | | |
|---|---|---|---|
| 9,521,218 B1 | 12/2016 | Fan et al. | |
| 10,503,516 B1 * | 12/2019 | Faibish | G06F 3/061 |
| 10,509,676 B1 * | 12/2019 | Bassov | G06F 3/064 |
| 10,664,165 B1 * | 5/2020 | Faibish | G06F 3/0638 |
| 10,924,625 B2 | 2/2021 | La et al. | |
| 2012/0131266 A1 * | 5/2012 | Cho | G06F 12/04 |
| | | | 711/E12.008 |
| 2012/0159512 A1 * | 6/2012 | Michailov | G06F 9/466 |
| | | | 719/313 |
| 2014/0244604 A1 | 8/2014 | Oltean et al. | |
| 2018/0145791 A1 * | 5/2018 | Martin | H03M 7/00 |

* cited by examiner

*Primary Examiner* — Charles J Choi
(74) *Attorney, Agent, or Firm* — KDW FIRM PLLC

(57) ABSTRACT

An accelerator device may access an input data chunk to be compressed by the accelerator device. The accelerator device may access an entropy value for the input data chunk. The accelerator device may compress the input data chunk or return an indication that the input data chunk will not be compressed based on the entropy value and an entropy threshold.

25 Claims, 6 Drawing Sheets

ACCESS, BY AN ACCELERATOR DEVICE, AN INPUT DATA CHUNK TO BE COMPRESSED BY THE ACCELERATOR DEVICE 502

ACCESS, BY THE ACCELERATOR DEVICE, AN ENTROPY VALUE FOR THE INPUT DATA CHUNK 504

BY THE ACCELERATOR DEVICE, COMPRESS THE INPUT DATA CHUNK OR RETURN AN INDICATION THAT THE INPUT DATA CHUNK WILL NOT BE COMPRESSED BASED ON THE ENTROPY VALUE AND AN ENTROPY THRESHOLD 506

500

200

500

ACCESS, BY AN ACCELERATOR DEVICE, AN INPUT DATA CHUNK TO BE COMPRESSED BY THE ACCELERATOR DEVICE 502

ACCESS, BY THE ACCELERATOR DEVICE, AN ENTROPY VALUE FOR THE INPUT DATA CHUNK 504

BY THE ACCELERATOR DEVICE, COMPRESS THE INPUT DATA CHUNK OR RETURN AN INDICATION THAT THE INPUT DATA CHUNK WILL NOT BE COMPRESSED BASED ON THE ENTROPY VALUE AND AN ENTROPY THRESHOLD 506

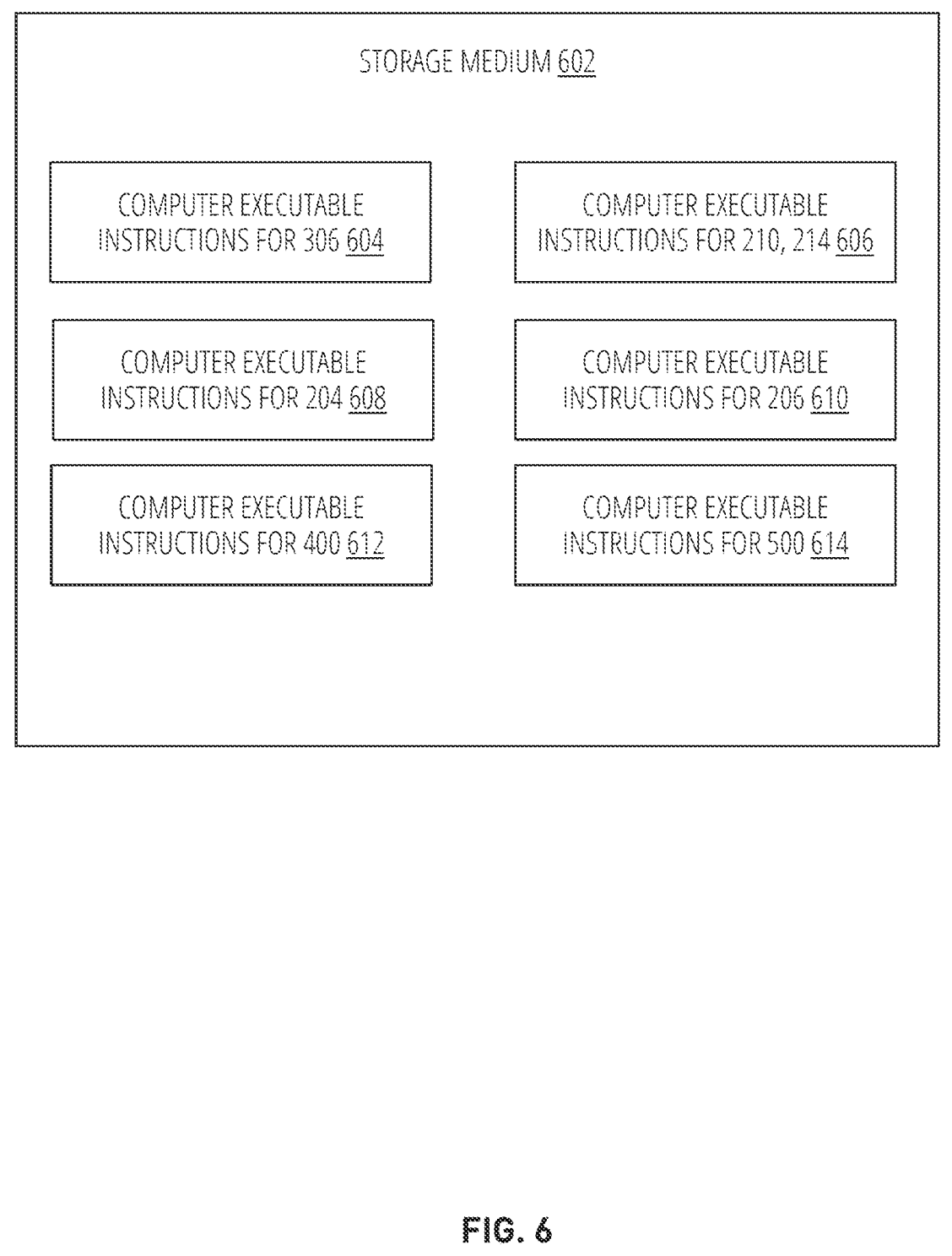

STORAGE MEDIUM 602

COMPUTER EXECUTABLE INSTRUCTIONS FOR 306 604

COMPUTER EXECUTABLE INSTRUCTIONS FOR 210, 214 606

COMPUTER EXECUTABLE INSTRUCTIONS FOR 204 608

COMPUTER EXECUTABLE INSTRUCTIONS FOR 206 610

COMPUTER EXECUTABLE INSTRUCTIONS FOR 400 612

COMPUTER EXECUTABLE INSTRUCTIONS FOR 500 614

FIG. 6

ADAPTIVE COMPRESSION FOR ACCELERATOR DEVICES

BACKGROUND

Often, data cannot be compressed in a manner that reduces the size of input data. However, conventional systems may use accelerator devices to compress data regardless of whether the output data is smaller than the input data. In such examples, the output data generated by the accelerator device may be larger than the input data. Doing so degrades system throughput and/or latency, as the accelerator has processed the data (even though the output is larger than the input). Further degradation to throughput and latency may occur as the output is sent to memory only to be returned to the accelerator device for further processing.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 6 illustrates an aspect of the subject matter in accordance with one embodiment.

DETAILED DESCRIPTION

Figure 1:
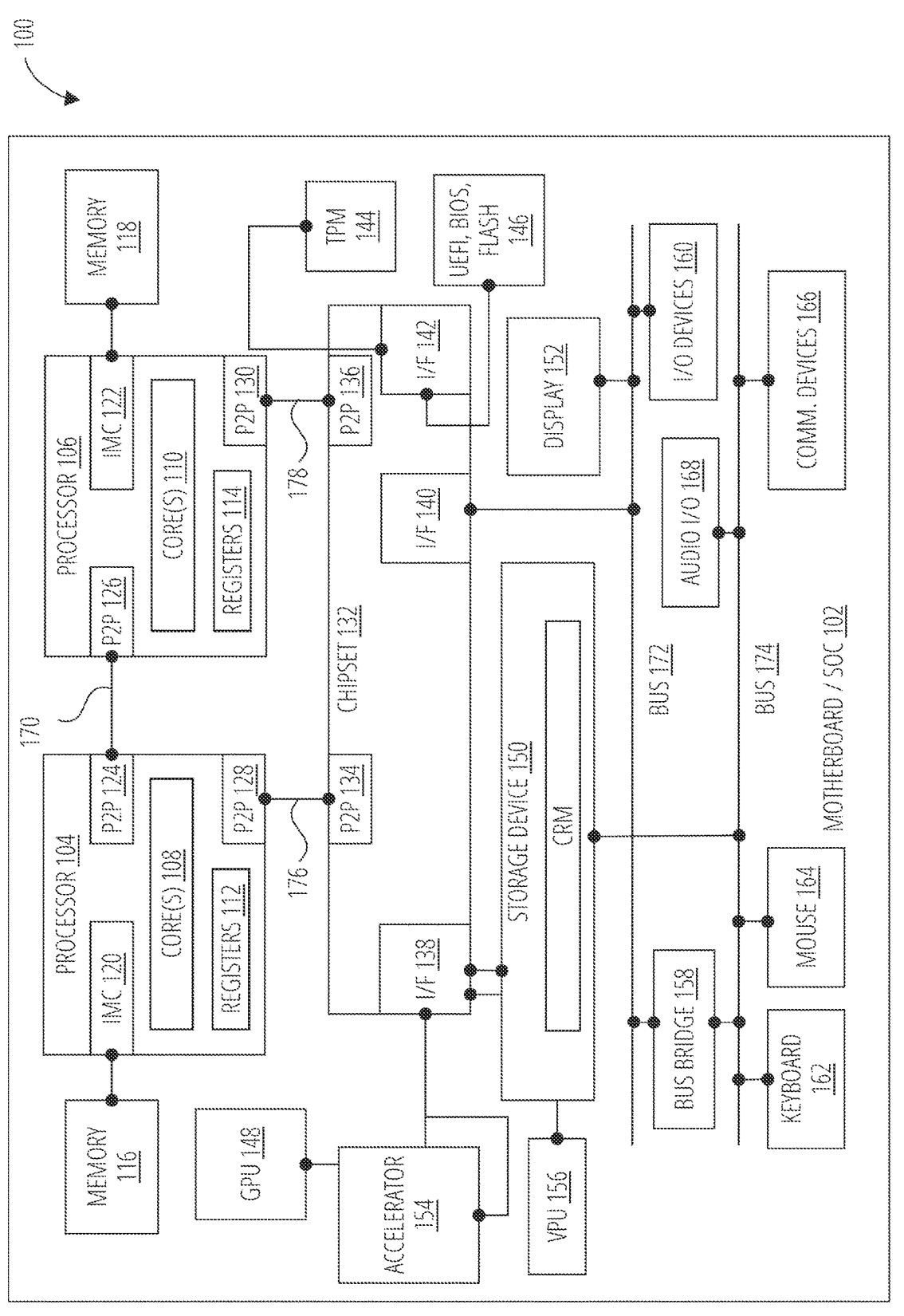
FIG. 1 illustrates an aspect of the subject matter in accordance with one embodiment.

Embodiments disclosed herein accelerate and achieve improved compression throughput and compression ratio performance for accelerator devices based on the entropy of data to be compressed by the accelerator devices. Generally, the accelerator device may receive a compression request including input data, a compression format, and an entropy threshold from an application. The compression format may be a lossless compression format. The accelerator device may compute an entropy value for the input data. The entropy value may be based on the entirety of the input data and/or a portion thereof. The accelerator device may compare the entropy value to the entropy threshold received from the application. If the entropy value exceeds the entropy threshold, the accelerator device may refrain from compressing the input data. In some embodiments, the accelerator may return an indication specifying that the input data will not be compressed (and can be accessed in its current memory location). In some embodiments, instead of compressing the input data, the accelerator device may generate stored blocks based on the input data and the compression format specified by the application and return the stored blocks to the application. The stored blocks (also referred to as "uncompressed blocks") may include compression format specific blocks that contain a block header and the uncompressed data. If, however, the entropy value does not exceed the entropy threshold, the accelerator may compress the input data and return the compressed data to the application.

In some embodiments, a size of the input data may exceed a size of a buffer of the accelerator device. In such embodiments, the buffer may be filled with respective portions (e.g., a data chunk) of the input data. In some such embodiments, the accelerator device may compute entropy values for the current data chunk in the buffer. The accelerator device may then compare each entropy value to the threshold. If the entropy value exceeds the threshold, the accelerator device may generate one or more stored blocks based on the data chunk. Otherwise, the accelerator device may compress the data chunk.

In some embodiments, however, the accelerator device may compute an entropy value for the first data chunk, and compare the entropy value for the first data chunk to the entropy threshold. The accelerator device may compress the first data chunk or generate one or more stored blocks for the first data chunk based on the entropy value and the entropy threshold. However, the accelerator device may refrain from computing entropy values for subsequent data chunks of the input data. In such embodiments, the accelerator device performs the same operation that was performed on the first data chunk to the subsequent data chunks. Therefore, if the first data chunk is compressed, the subsequent data chunks may be compressed (even if entropy values for the subsequent blocks are greater than the threshold). Similarly, if the first data chunk is converted into stored blocks, the subsequent data chunks are converted to stored blocks (even if entropy values for the subsequent blocks are less than the threshold).

Some compression formats, including lossless compression formats, may not compress data such that the output is smaller than the input (and/or such that the output is larger than the input). However, conventional systems compress data only to discover that the output is larger than the input. Advantageously, embodiments disclosed herein improve the performance of accelerator devices and/or associated computing systems by avoiding the overhead incurred by attempting to compress data that is not compressible. For example, system throughput and latency may be improved by at least 10% by refraining from compressing uncompressible data. Advantageously, however, the best possible compression ratio is maintained by the accelerator when compressing data. Furthermore, by either generating stored blocks or compressing the data, the accelerator processes data one time. Doing so improves the functioning of the accelerator and/or associated computing devices by refraining from attempting to compress uncompressible data and refraining from re-processing the uncompressible data another time (e.g., to create stored blocks based on the uncompressible data after performing the compression operation). Doing so further improves system performance by refraining from transmitting the compressed data (that is greater than and/or equal to the size of the input data) to memory, which would then be returned to the accelerator from the memory to generate stored blocks.

With general reference to notations and nomenclature used herein, one or more portions of the detailed description which follows may be presented in terms of program procedures executed on a computer or network of computers. These procedural descriptions and representations are used by those skilled in the art to convey the substances of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include digital computers as selectively activated or configured by a computer program stored within that is written in accordance with the teachings herein, and/or include apparatus specially constructed for the required purpose or a digital computer. Various embodiments also relate to apparatus or systems for performing these operations. These apparatuses may be specially constructed for the required purpose. The required structure for a variety of these machines will be apparent from the description given.

Reference is now made to the drawings, wherein like reference numerals are used to refer to like elements throughout. In the following description, for the purpose of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modification, equivalents, and alternatives within the scope of the claims.

In the Figures and the accompanying description, the designations "a" and "b" and "c" (and similar designators) are intended to be variables representing any positive integer. Thus, for example, if an implementation sets a value for a=5, then a complete set of components 123 illustrated as components 123-1 through 123-a (or 123a) may include components 123-1, 123-2, 123-3, 123-4, and 123-5. The embodiments are not limited in this context.

FIG. 1 illustrates an embodiment of a system 100. System 100 is a computer system with multiple processor cores such as a distributed computing system, supercomputer, high-performance computing system, computing cluster, mainframe computer, mini-computer, client-server system, personal computer (PC), workstation, server, portable computer, laptop computer, tablet computer, handheld device such as a personal digital assistant (PDA), or other device for processing, displaying, or transmitting information. Similar embodiments may comprise, e.g., entertainment devices such as a portable music player or a portable video player, a smart phone or other cellular phone, a telephone, a digital video camera, a digital still camera, an external storage device, or the like. Further embodiments implement larger scale server configurations. In other embodiments, the system 100 may have a single processor with one core or more than one processor. Note that the term "processor" refers to a processor with a single core or a processor package with multiple processor cores. More generally, the computing system 100 is configured to implement all logic, systems, logic flows, methods, apparatuses, and functionality described herein with reference to FIGS. 1-6.

As used in this application, the terms "system" and "component" and "module" are intended to refer to a computer-related entity, either hardware, a combination of hardware and software, software, or software in execution, examples of which are provided by the exemplary system 100. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

As shown in FIG. 1, system 100 comprises a motherboard or system-on-chip (SoC) 102 for mounting platform components. Motherboard or system-on-chip (SoC) 102 is a point-to-point (P2P) interconnect platform that includes a first processor 104 and a second processor 106 coupled via a point-to-point interconnect 170 such as an Ultra Path Interconnect (UPI). In other embodiments, the system 100 may be of another bus architecture, such as a multi-drop bus. Furthermore, each of processor 104 and processor 106 may be processor packages with multiple processor cores including core(s) 108 and core(s) 110, respectively. While the system 100 is an example of a two-socket (2S) platform, other embodiments may include more than two sockets or one socket. For example, some embodiments may include a four-socket (4S) platform or an eight-socket (8S) platform. Each socket is a mount for a processor and may have a socket identifier. Note that the term platform refers to the motherboard with certain components mounted such as the processor 104 and chipset 132. Some platforms may include additional components and some platforms may only include sockets to mount the processors and/or the chipset. Furthermore, some platforms may not have sockets (e.g. SoC, or the like). Although depicted as a motherboard or SoC 102, one or more of the components of the motherboard or SoC 102 may also be included in a single die package, a multi-chip module (MCM), a multi-die package, a chiplet, a bridge, and/or an interposer. Therefore, embodiments are not limited to a motherboard or a SoC.

The processor 104 and processor 106 can be any of various commercially available processors, including without limitation an Intel® Celeron®, Core®, Core (2) Duo®, Itanium®, Pentium®, Xeon®, and XScale® processors; AMD® Athlon®, Duron® and Opteron® processors; ARM® application, embedded and secure processors; IBM® and Motorola® DragonBall® and PowerPC® processors; IBM and Sony® Cell processors; and similar processors. Dual microprocessors, multi-core processors, and other multi-processor architectures may also be employed as the processor 104 and/or processor 106. Additionally, the processor 104 need not be identical to processor 106.

Processor 104 includes an integrated memory controller (IMC) 120 and point-to-point (P2P) interface 124 and P2P interface 128. Similarly, the processor 106 includes an IMC 122 as well as P2P interface 126 and P2P interface 130. IMC 120 and IMC 122 couple the processor 104 and processor 106, respectively, to respective memories (e.g., memory 116 and memory 118). Memory 116 and memory 118 may be portions of the main memory (e.g., a dynamic random-access memory (DRAM)) for the platform such as double data rate type 3 (DDR3) or type 4 (DDR4) synchronous DRAM (SDRAM). In the present embodiment, the memory 116 and the memory 118 locally attach to the respective processors (i.e., processor 104 and processor 106). In other embodiments, the main memory may couple with the processors via a bus and shared memory hub. Processor 104 includes registers 112 and processor 106 includes registers 114.

System 100 includes chipset 132 coupled to processor 104 and processor 106. Furthermore, chipset 132 can be coupled to storage device 150, for example, via an interface (I/F) 138. The I/F 138 may be, for example, a Peripheral Component Interconnect-enhanced (PCIe) interface, a Compute Express Link® (CXL) interface, or a Universal Chiplet Interconnect Express (UCIe) interface. Storage device 150 can store instructions executable by circuitry of system 100 (e.g., processor 104, processor 106, GPU 148, an accelerator 154, vision processing unit 156, or the like). For example, storage device 150 can store instructions for compression algorithms, or the like.

Processor 104 couples to the chipset 132 via P2P interface 128 and P2P 134 while processor 106 couples to the chipset 132 via P2P interface 130 and P2P 136. Direct media interface (DMI) 176 and DMI 178 may couple the P2P interface 128 and the P2P 134 and the P2P interface 130 and P2P 136, respectively. DMI 176 and DMI 178 may be a high-speed interconnect that facilitates, e.g., eight Giga Transfers per second (GT/s) such as DMI 3.0. In other embodiments, the processor 104 and processor 106 may interconnect via a bus.

The chipset 132 may comprise a controller hub such as a platform controller hub (PCH). The chipset 132 may include a system clock to perform clocking functions and include interfaces for an I/O bus such as a universal serial bus (USB), peripheral component interconnects (PCIs), CXL interconnects, UCIe interconnects, interface serial peripheral interconnects (SPIs), integrated interconnects (I2Cs), and the like, to facilitate connection of peripheral devices on the platform. In other embodiments, the chipset 132 may comprise more than one controller hub such as a chipset with a memory controller hub, a graphics controller hub, and an input/output (I/O) controller hub.

In the depicted example, chipset 132 couples with a trusted platform module (TPM) 144 and UEFI, BIOS, FLASH circuitry 146 via I/F 142. The TPM 144 is a dedicated microcontroller designed to secure hardware by integrating cryptographic keys into devices. The UEFI, BIOS, FLASH circuitry 146 may provide pre-boot code.

Furthermore, chipset 132 includes the I/F 138 to couple chipset 132 with a high-performance graphics engine, such as, graphics processing circuitry or a graphics processing unit (GPU) 148. In other embodiments, the system 100 may include a flexible display interface (FDI) (not shown) between the processor 104 and/or the processor 106 and the chipset 132. The FDI interconnects a graphics processor core in one or more of processor 104 and/or processor 106 with the chipset 132.

Additionally, accelerator 154 and/or vision processing unit 156 can be coupled to chipset 132 via I/F 138. The accelerator 154 is representative of any type of accelerator device, such as a cryptographic accelerator, cryptographic co-processor, an offload engine, and the like. The accelerator 154 may be a device including circuitry to accelerate data encryption and/or data compression. The data compression may be performed according to a lossless compression format. The accelerator 154 can also include circuitry arranged to execute machine learning (ML) related operations (e.g., training, inference, etc.) for ML models. Generally, the accelerator 154 may be specially designed to perform computationally intensive operations, such as cryptographic operations and/or compression operations, in a manner that is far more efficient than when performed by the processor 104 or processor 106. Because the load of the system 100 may include cryptographic and/or compression operations, the accelerator 154 can greatly increase performance of the system 100 for these operations.

Vision processing unit 156 can be circuitry arranged to execute vision processing specific or related operations. In particular, accelerator 154 and/or vision processing unit 156 can be arranged to execute mathematical operations and/or operands useful for machine learning, neural network processing, artificial intelligence, vision processing, compression, encryption, etc.

Various I/O devices 160 and display 152 couple to the bus 172, along with a bus bridge 158 which couples the bus 172 to a second bus 174 and an I/F 140 that connects the bus 172 with the chipset 132. In one embodiment, the second bus 174 may be a low pin count (LPC) bus. Various devices may couple to the second bus 174 including, for example, a keyboard 162, a mouse 164 and communication devices 166.

Furthermore, an audio I/O 168 may couple to second bus 174. Many of the I/O devices 160 and communication devices 166 may reside on the motherboard or system-on-chip (SoC) 102 while the keyboard 162 and the mouse 164 may be add-on peripherals. In other embodiments, some or all the I/O devices 160 and communication devices 166 are add-on peripherals and do not reside on the motherboard or system-on-chip (SoC) 102.

Figure 2:
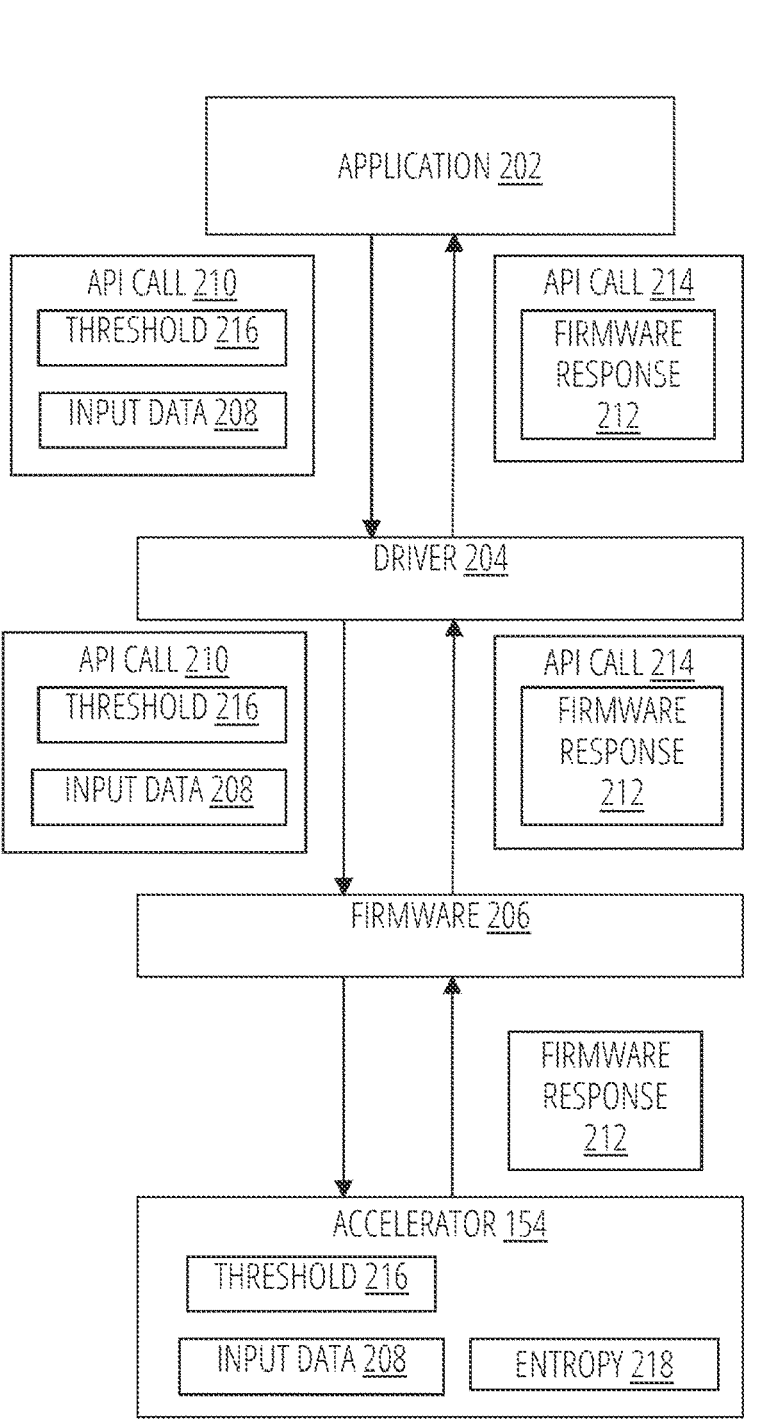
FIG. 2 illustrates an aspect of the subject matter in accordance with one embodiment.

FIG. 2 is a schematic 200 illustrating an example of adaptive compression performed by accelerator devices, according to one embodiment. Generally, an application 202 may require compression of input data 208. The application 202 may be executing on one or more of the processors 104, 106. The application 202 is representative of any type of executable code. For example, the application 202 may be representative of a process or a microservice. Furthermore, the code may execute within a virtual machine, container, or other virtualized system, e.g., in a cloud computing data center. In such embodiments, multiple applications 202 and/or virtualized systems may share the accelerator 154, where the accelerator 154 is a virtual instance of the physical accelerator 154 (e.g., according to the Single Root I/O virtualization (SR-IOV) architecture and/or the Scalable I/O virtualization (S-IOV) architecture). Furthermore, the application 202 or other executable code may execute within an operating system (OS) (not pictured) that provides support for the accelerator 154. Examples of such operating systems include the FreeBSD® family of operating systems, Linux® operating systems, and Microsoft® Windows® OSes. Furthermore, the application 202 or other executable code may be a part of the Apache® Hadoop® framework, including the Hadoop Distributed File System (HDFS®), the Microsoft Azure® cloud computing framework, or any other cloud computing framework supporting compression acceleration technology.

The input data 208 may be any type of data and may be stored in the memory 116 and/or memory 118. In some embodiments, the input data 208 is cleartext data. In some embodiments, the input data 208 may be communicated using a secure transport protocol (e.g., the Transport Layer Security (TLS) protocol). In some embodiments, the input data 208 may be used as part of a trust as-a-service framework. As stated, the accelerator 154 is configured to compress data much more efficiently and quickly than the processors 104, 106. Therefore, the application 202 may request that the accelerator 154 compress the input data 208 according to one or more compression formats, including but not limited to lossless compression formats (e.g., compression formats that allows the input data 208 to be perfectly reconstructed from the compressed data with no loss of information). Example compression formats include, but are not limited to the DEFLATE, LZ4, and/or Zstandard (or Zstd) compression formats. However, lossless compression formats are not guaranteed to reduce the size of the input data 208.

As shown, the application 202 may generate an application programming interface (API) call 210 that includes an indication of an entropy threshold 216 and an indication of the input data 208. The API call 210 may further specify a compression format to be used to compress the input data 208. Any suitable compression format may be specified, including but not limited to, lossless compression formats. The indication of the input data 208 in the API call 210 may include a memory address of the input data 208 and/or pointer to the input data 208. The entropy threshold 216 is a configurable threshold provided by the application 202. The entropy threshold 216 may generally be used by the accelerator 154 to determine whether to compress the input data 208. In some embodiments, a given application 202 may be configured with a plurality of different entropy thresholds 216, and may select a given one of the entropy thresholds 216 based on any number of factors. Similarly, different applications may use one or more entropy thresholds 216 based on any number of factors.

As shown, a device driver 204 of the accelerator 154 may receive the API call 210. The device driver 204 may include a microservice (not pictured) configured to expose one or more APIs that correspond to the API call 210. Once received, the driver 204 may provide an instance of the API call 210 to firmware 206 of the accelerator 154. In some embodiments, the driver 204 modifies and/or generates a different API call 210 that is provided to the firmware 206. In some embodiments, the firmware 206 includes a microservice configured to expose one or more APIs that correspond to the API call 210. The firmware 206 may then provide at least the entropy threshold 216 and the input data 208 to the accelerator 154.

The accelerator 154 may then compute an entropy value 218 for the input data 208. Generally, the entropy value 218 corresponds to the information entropy (also referred to as "Shannon entropy") of the input data 208, which generally reflects a measure of uncertainty or variability of data. Stated differently, the information entropy reflected by the entropy value 218 may indicate the randomness and/or orderliness of the input data 208. Any suitable algorithm may be used to compute the entropy value 218, such as the Shannon entropy algorithm. In some embodiments, computing the entropy value 218 may include generating B-ary trees (where d is >2), where the entropy provides the fundamental lower bound on the compression of such trees. In some embodiments, the accelerator 154 may receive the entropy value from another source (e.g., the processor 104, processor 106, a remote device, etc.) that computed the entropy value. Advantageously, the entropy value 218 and the entropy threshold 216 are used to provide an alternate processing path for the accelerator 154, e.g., by compressing input data 208 that is likely to be compressible, rather than wasting system resources to compress input data that is not likely to be compressible.

Generally, higher entropy values 218 may indicate a greater likelihood that the input data 208 cannot be compressed such that the output is smaller than the input data 208 (or within a threshold difference in size of the input data 208 and/or within a threshold percentage of the size of the input data 208). Similarly, smaller entropy values 218 may indicate a greater likelihood that the input data 208 can be compressed such that the output is smaller than the input data 208.

The accelerator 154 may compute the entropy value 218 based on the input data 208 and/or a predetermined portion thereof (e.g., the first 512 bytes, etc.). By sampling a portion of the input data 208 (rather than the entirety of the input data 208) to compute the entropy value 218, the cost of computing the entropy value 218 is reduced. The accelerator 154 may then compare the entropy value 218 to the entropy threshold 216 received from the application 202. If the entropy value 218 is greater than (or greater than or equal to) the entropy threshold 216, the accelerator 154 may refrain from compressing the input data 208. In some such embodiments, the accelerator 154 may generate one or more stored blocks (also referred to as "uncompressed blocks") of the uncompressed input data 208. The generation of the stored blocks may include inserting a header in each block, where the header can be recognized by a software-based compression library, such as the Zlib library, LZ4 library, and/or Zstandard (or Zstd) library. If, however, the entropy value 218 is less than (or less than or equal to) the entropy threshold 216, the accelerator 154 may compress the input data 208.

As shown, the accelerator 154 returns a firmware response 212 indicating that the input data 208 was compressed and/or converted to one or more stored blocks. In some embodiments, the firmware response 212 further indicates a memory location (e.g., an address) of the compressed data and/or the stored blocks. The firmware response 212 may further include a size of the compressed data and/or the stored blocks, a checksum of the input data 208, and a checksum of the compressed data and/or the stored blocks. The firmware 206 may generate an API call 214 including an indication of the firmware response 212 that is transmitted to the driver 204. The driver 204 may return the API call 214 to the application 202. The application 202 may then access the compressed data and/or stored blocks based on the firmware response 212.

In some embodiments where the entropy value 218 is greater than (or greater than or equal to) the entropy threshold 216, the accelerator 154 may refrain from compressing the input data 208 and refrain from generating the stored blocks. Instead, the accelerator 154 may return an indication to the application 202 that the input data 208 will not be compressed. For example, the firmware response 212 may indicate that the input data 208 will not be compressed. The firmware response 212 may further indicate the memory location of the input data 208 to the application 202 for further processing.

Figure 3:
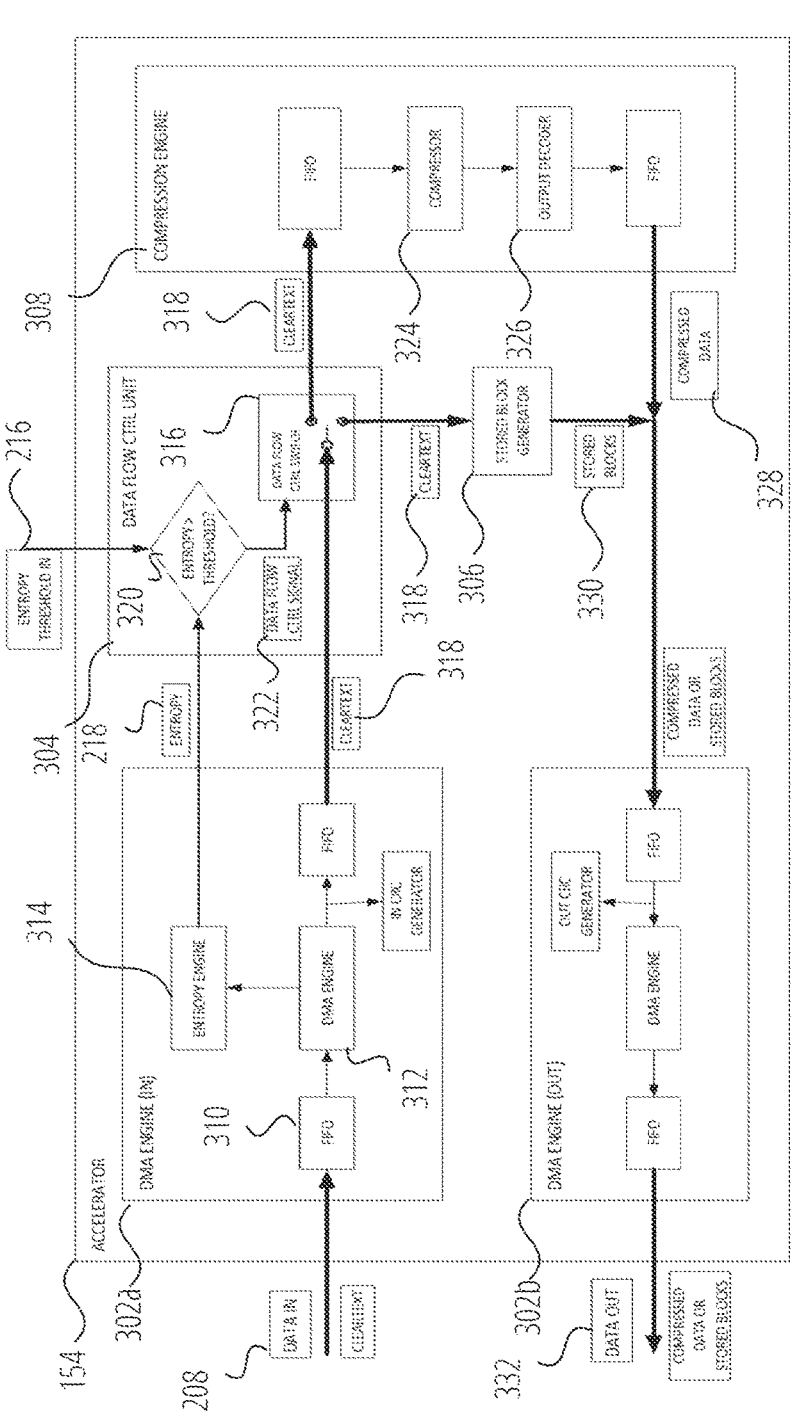
FIG. 3 illustrates an aspect of the subject matter in accordance with one embodiment.

FIG. 3 is a schematic 300 illustrating components of the system 100 in greater detail. As shown, the accelerator 154 includes a direct memory access (DMA) engine 302a, a DMA engine 302b, a data flow control unit 304, a stored block generator 306, and a compression engine 308. The DMA engines 302a, 302b, data flow control unit 304, stored block generator 306, and compression engine 308 (and components thereof) may be implemented in hardware (e.g., circuitry). In some embodiments, the data flow control unit 304 and/or stored block generator 306 may be implemented software and/or a combination of hardware and software.

Generally, the DMA engine 302a handles DMA operations to receive input data 208 from memory 116 and/or memory 118, while the DMA engine 302b handles DMA operations to return compressed data and/or stored blocks to memory 116 and/or memory 118. As shown, the input data 208 (and/or a portion thereof) may be stored in a first-in-first-out (FIFO) buffer 310 of the DMA engine 312. Once stored in the FIFO buffer 310, the input data 208 may be referred to as a "data chunk". Based on a size of the input data 208 and a size of the FIFO buffer 310, the input data 208 may be processed by the accelerator 154 in one or more data chunks. For example, if the FIFO buffer 310 is 64 kilobytes, each data chunk is a 64 kilobyte portion of the input data 208.

As shown, the DMA engine 302a includes an entropy engine 314, which is circuitry configured to compute the entropy value 218 for a current data chunk 318 of input data 208. As stated, the entropy value 218 may be computed based on the data chunk 318 and/or a portion thereof. As shown, the entropy value 218 is provided to the data flow control unit 304. In a parallel path, the data chunk 318 is provided to the data flow control unit 304. By computing entropy value 218 parallel to the transfer of the data chunk 318 to the data flow control unit 304, system performance is not degraded.

The data flow control unit 304 is circuitry that includes a comparator 320 to compare the entropy value 218 to the entropy value 218 received from the application 202. The comparator may provide a control signal 322 that indicates a result of the comparison to a switch 316. Based on the control signal 322, the switch 316 may transmit the data chunk 318 to the compression engine 308 for compression, or to the stored block generator 306 to generate one or more stored blocks 330.

For example, if the entropy value 218 is greater than the entropy threshold 216, the control signal 322 may cause the switch 316 to transmit the data chunk 318 to the stored block generator 306. In such an example, the stored block generator 306 generates one or more stored blocks 330 by inserting headers according to the compression format specified by the application 202 into the uncompressed data chunk 318. The stored blocks 330 may then be provided to the DMA engine 302b.

As another example, if the entropy value 218 is less than the entropy threshold 216, the control signal 322 may cause the switch 316 to transmit the data chunk 318 to the compression engine 308 for compression based on the compression format specified by the application 202. The compression engine 308 is representative of an array of compressors 324 (also referred to as an array of accelerators) implemented in circuitry that compresses the data chunk 318. The output of the compressors 324 may be provided to one or more decoders 326 implemented in circuitry to generate the compressed data 328. The compressed data 328 may then be provided to the DMA engine 302b.

For a given data chunk 318, the accelerator 154 generates one of the stored blocks 330 or the compressed data 328. The stored blocks 330 or the compressed data 328 may be returned to the application 202 as an output 332 of the accelerator 154 via the DMA engine 302b. In some embodiments, the output 332 includes an indication of the outcome (e.g., whether the data was compressed to the compressed data 328 or converted to stored blocks 330 and a respective memory address thereof). The output 332 may be stored in memory 116 or memory 118 via DMA by the DMA engine 302b.

However, in some embodiments, different data chunks 318 of the same input data 208 may have different outcomes when processed by the accelerator 154. For example, a first data chunk 318 may be compressed into compressed data 328 based on the entropy value 218 for the first data chunk 318 and the entropy threshold 216. However, a second data chunk 318 may be converted to stored blocks 330 based on the entropy value 218 for the second data chunk 318 and the entropy threshold 216. In some embodiments, the application 202 may provide different entropy thresholds 216 for the first data chunk 318 and the second data chunk 318.

In some embodiments, different data chunks 318 of the same input data 208 are processed similarly by the accelerator 154. For example, a first data chunk 318 may be compressed into compressed data 328 based on the entropy value 218 for the first data chunk 318 and the entropy threshold 216. As subsequent data chunks 318 of the input data 208 are loaded into the FIFO buffer 310, these subsequent data chunks 318 are also compressed based on the compression of the first data chunk 318. Doing so eliminates the need to compute distinct entropy values 218 for each data chunk 318 and perform the comparison by the comparator 320. In such embodiments, subsequent data chunks 318 may be compressed even though the respective entropy values 218 would require generation of stored blocks 330 for these data chunks 318 (e.g., based on a comparison of the entropy values 218 and the entropy thresholds 216). Similarly, subsequent data chunks 318 may be converted to stored blocks 330 even though the respective entropy values 218 would require compression of these data chunks 318 (e.g., based on a comparison of the entropy values 218 and the entropy thresholds 216).

Advantageously, the system 100 reduces the complexity of the firmware 206 of the accelerator 154, as the firmware 206 may not need to include logic to identify cases where data is compressed, but the compressed data is larger than the input data (and therefore needs to be processed again to be converted to stored blocks). In some embodiments, the source code of the firmware 206 may be reduced in size by 10% or more. Furthermore, by operating on smaller portions of the input data 208 (e.g., the data chunks 318) that are based on the size of the FIFO buffer 310, the accelerator 154 can compress data chunks 318 that are compressible and generate stored blocks 330 for data chunks 318 that are not compressible, thereby improving the overall compression ratio for the accelerator 154. Furthermore, by allowing the entropy threshold 216 to be a configurable parameter, users can choose different entropy thresholds 216 to balance compression ratio and throughput/latency.

Operations for the disclosed embodiments may be further described with reference to the following figures. Some of the figures may include a logic flow. Although such figures presented herein may include a particular logic flow, it can be appreciated that the logic flow merely provides an example of how the general functionality as described herein can be implemented. Further, a given logic flow does not necessarily have to be executed in the order presented unless otherwise indicated. Moreover, not all acts illustrated in a logic flow may be required in some embodiments. In addition, the given logic flow may be implemented by a hardware element, a software element executed by a processor, or any combination thereof. The embodiments are not limited in this context.

Figure 4:
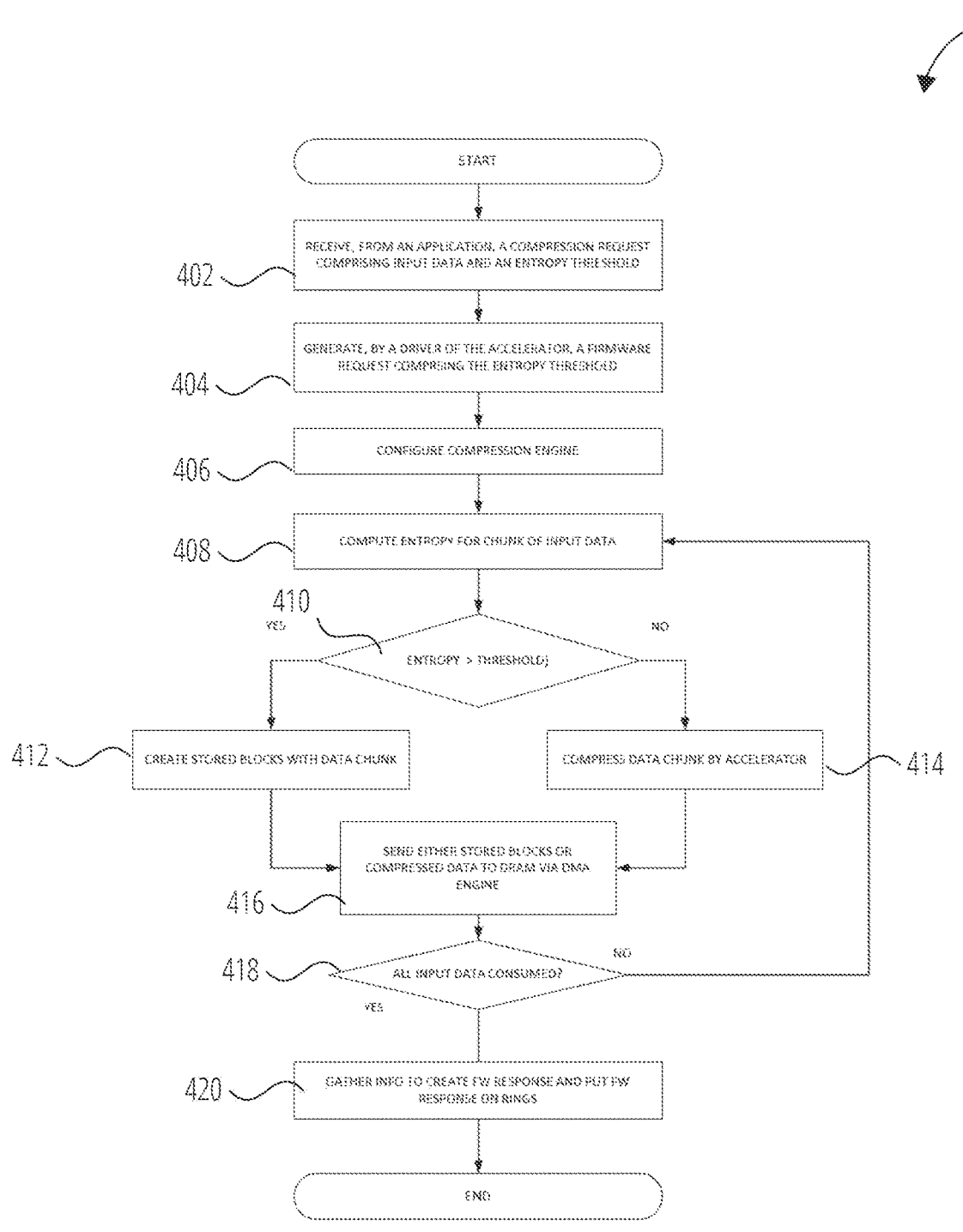
FIG. 4 illustrates a logic flow 400 in accordance with one embodiment.

FIG. 4 illustrates an embodiment of a logic flow 400. The logic flow 400 may be representative of some or all of the operations executed by one or more embodiments described herein. For example, the logic flow 400 may include some or all of the operations performed by the accelerator 154 to process data based on an entropy of the data and an entropy threshold. Embodiments are not limited in this context.

At block 402, an accelerator 154 may receive a compression request comprising indications of input data 208, a compression format, and an entropy threshold 216 from an application 202. For example, the application 202 may generate an API call comprising an indication of a memory address of the input data 208, a compression format, and an example entropy threshold 216 of 25. At block 404, the driver 204 of the accelerator 154 may generate a firmware request comprising the entropy threshold 216 and provide the request to the firmware 206. At block 406, the firmware 206 may configure the compression engine 308 based on the request. At block 408, the entropy engine 314 may compute an entropy value 218 for a data chunk 318 of the input data 208. However, as stated, in some embodiments, the entropy value 218 may be received from another source.

At block 410, the comparator 320 determines whether the entropy value 218 exceeds the entropy threshold 216. If the entropy value 218 exceeds the threshold, the flow 400 proceeds to block 412. If the entropy value 218 does not exceed the entropy threshold 216, the flow 400 proceeds to block 414. For example, the entropy value 218 may be 10. In such an example, the entropy value 218 does not exceed the entropy threshold 216, and the accelerator 154 compresses the data chunk 318 at block 414. As another example, the entropy value 218 may be 30. In such an example, the entropy value 218 exceeds the entropy threshold 216, and the stored block generator 306 converts the data chunk 318 to one or more stored blocks 330.

At block 416, the accelerator 154 returns the stored blocks 330 or the compressed data 328, as the case may be, to memory via the DMA engine 302*b*. At block 418, the accelerator 154 determines whether the input data 208 has been consumed. If additional input data 208 remains, the flow 400 returns to block 408. Otherwise, the flow 400 proceeds to block 420, where the firmware 206 gathers the information required to generate a firmware response and put the firmware response on one or more rings of the accelerator 154.

Figure 5:
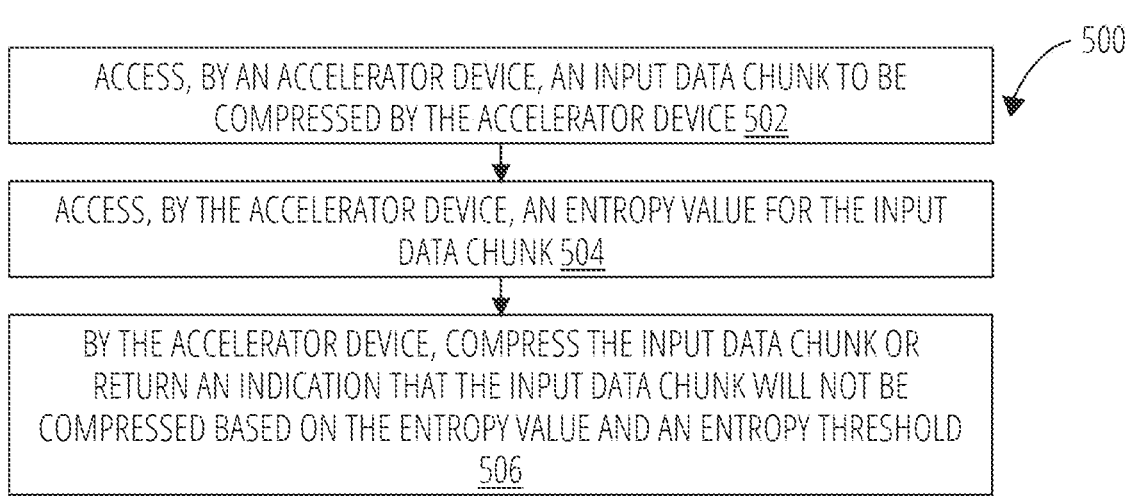
FIG. 5 illustrates a logic flow 500 in accordance with one embodiment.

FIG. 5 illustrates an embodiment of a logic flow 500. The logic flow 500 may be representative of some or all of the operations executed by one or more embodiments described herein. For example, the logic flow 500 may include some or all of the operations performed by the accelerator 154 to process data based on an entropy of the data and an entropy threshold. The embodiments are not limited in this context.

In block 502, the accelerator 154 accesses an input data chunk 318 to be compressed by the accelerator device. In block 504, the accelerator 154 access an entropy value 218 for the input data chunk 318. For example, the accelerator 154 may compute the entropy value 218. As another example, the accelerator 154 may receive the entropy value 218 from another source (e.g., the processor 104, processor 106, the application 202, a remote device, etc. In block 506, the accelerator 154, compresses the input data chunk 318 or returns an indication that the input data chunk will not be compressed based on the entropy value 218 and an entropy threshold 216. In some embodiments, if the accelerator 154 returns the indication that the input data chunk 318 will not be compressed, the accelerator 154 may generate one or more stored blocks 330 for the input data chunk 318.

FIG. 6 illustrates an embodiment of a storage medium 602. Storage medium 602 may comprise any non-transitory computer-readable storage medium or machine-readable storage medium, such as an optical, magnetic, or semiconductor storage medium. In various embodiments, storage medium 602 may comprise an article of manufacture. In some embodiments, storage medium 602 may store computer-executable instructions, such as computer-executable instructions to implement one or more of logic flows or operations described herein, such as instructions 612, 614, for logic flows 400, 500 of FIGS. 4-5, respectively. The storage medium 602 may further store computer-executable instructions 604 for the stored block generator 306, instructions 606 for the API call 210 and the API call 214, instructions 608 for the driver 204, and instructions 610 for the firmware 206. The accelerator 154, processor 104, and/or processor 106 may execute any of the instructions in storage medium 602. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

The various elements of the devices as previously described with reference to FIGS. 1-6 may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

It will be appreciated that the exemplary devices shown in the block diagrams described above may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

At least one computer-readable storage medium may include instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

The following examples pertain to further embodiments, from which numerous permutations and configurations will be apparent.

Example 1 includes an apparatus comprising: a processor; and an accelerator device, the accelerator device to comprise circuitry configured to: access an input data chunk to be compressed by the accelerator device; access an entropy value for the input data chunk; and compress the input data chunk or return an indication that the input data chunk will not be compressed based on the entropy value and an entropy threshold.

Example 2 includes the subject matter of example 1, wherein the circuitry to access the entropy value is to comprise one or more of: (i) circuitry to compute the entropy value based on the input data chunk, or (ii) circuitry to receive the entropy value from another source.

Example 3 includes the subject matter of example 1, wherein the entropy value is to be computed based on a predetermined subset of bits of the input data chunk.

Example 4 includes the subject matter of example 1, wherein a size of the input data chunk is to be based on a size of a buffer of the accelerator device.

Example 5 incudes the subject matter of example 1, wherein the input data chunk is a first input data chunk of a plurality of input data chunks received from an application, a virtual machine, or a microservice, wherein the circuitry of the accelerator device is to compress the first input data chunk based on the entropy value and the entropy threshold.

Example 6 includes the subject matter of example 5, the accelerator device to comprise circuitry configured to: access an entropy value for a second input data chunk of the plurality of input data chunks; and generate a stored block for the second input data chunk based on the entropy value for the second input data chunk and the entropy threshold.

Example 7 includes the subject matter of example 5, the accelerator device to comprise circuitry configured to: receive a second input data chunk of the plurality of input data chunks; and compress the second input data chunk based on the compression of the first input data chunk.

Example 8 includes the subject matter of example 7, wherein an entropy value for the second input data chunk exceeds the entropy threshold, wherein the entropy value for the first input data chunk is less than the entropy threshold.

Example 9 includes the subject matter of example 1, wherein the input data chunk, an indication of a lossless compression format, and the entropy threshold are to be received from an application, a virtual machine, or a microservice via one or more application programming interface (API) calls to a microservice of the accelerator device.

Example 10 includes the subject matter of example 9, the accelerator device to comprise circuitry configured to: return, to the application, the virtual machine, or the microservice, a response to indicate that the input data chunk was compressed or the stored block was generated.

Example 11 includes the subject matter of example 1, wherein the input data chunk is to comprise uncompressed data, wherein the circuitry to generate the stored block is to comprise circuitry to insert one or more headers into the input data chunk.

Example 12 includes a method, comprising: accessing, by an accelerator device, an input data chunk to be compressed by the accelerator device; accessing, by the accelerator device, an entropy value for the input data chunk; and by the accelerator device, compressing the input data chunk or returning an indication that the input data chunk will not be compressed based on the entropy value and an entropy threshold.

Example 13 includes the subject matter of example 12, wherein accessing the entropy value comprises one or more of: (i) computing the entropy value by the accelerator device based on the input data chunk, or (ii) receiving, by the accelerator device, the entropy value from another source.

Example 14 includes the subject matter of example 12, wherein the entropy value is computed by the accelerator device based on a predetermined subset of bits of the input data chunk.

Example 15 includes the subject matter of example 12, wherein a size of the input data chunk is based on a size of a buffer of the accelerator device.

Example 16 includes the subject matter of example 12, wherein the input data chunk is a first input data chunk of a plurality of input data chunks received from an application, a virtual machine, or a microservice, wherein the first input data chunk is compressed by the accelerator device based on the entropy value and the entropy threshold.

Example 17 includes the subject matter of example 16, further comprising: computing, by the accelerator device, an entropy value for a second input data chunk of the plurality of input data chunks; and generating, by the accelerator device, a stored block for the second input data chunk based on the entropy value for the second input data chunk and the entropy threshold.

Example 18 includes the subject matter of example 16, further comprising: receiving, by the accelerator device, a second input data chunk of the plurality of input data chunks; and compressing, by the accelerator device, the second input data chunk based on the compression of the first input data chunk.

Example 19 includes the subject matter of example 18, wherein an entropy value for the second input data chunk exceeds the entropy threshold, wherein the entropy value for the first input data chunk is less than the entropy threshold.

Example 20 includes the subject matter of example 12, wherein the input data chunk, an indication of a lossless compression format, and the entropy threshold are received from an application, a virtual machine, or a microservice via one or more application programming interface (API) calls to a microservice of the accelerator device.

Example 21 includes the subject matter of example 20, further comprising returning, to the application, the virtual machine, or the microservice, a response indicating that the input data chunk was compressed or the stored block was generated.

Example 22 includes the subject matter of example 12, wherein the input data chunk comprises uncompressed data, wherein generating the stored block comprises inserting one or more headers into the input data chunk.

Example 23 includes an accelerator device, comprising: an interface to a processor; and circuitry configured to: access an input data chunk to be compressed by the accelerator device; access an entropy value for the input data chunk; and compress the input data chunk or return an indication that the input data chunk will not be compressed based on the entropy value and an entropy threshold.

Example 24 includes the subject matter of example 23, wherein the circuitry to access the entropy value is to comprise one or more of: (i) circuitry to compute the entropy value based on the input data chunk, or (ii) circuitry to receive the entropy value from another source.

Example 25 includes the subject matter of example 23, wherein the entropy value is to be computed based on a predetermined subset of bits of the input data chunk.

Example 26 includes the subject matter of example 23, wherein a size of the input data chunk is to be based on a size of a buffer of the accelerator device.

Example 27 includes the subject matter of example 23, wherein the input data chunk is a first input data chunk of a plurality of input data chunks received from an application, a virtual machine, or a microservice, wherein the circuitry of the accelerator device is to compress the first input data chunk based on the entropy value and the entropy threshold.

Example 28 includes the subject matter of example 27, the accelerator device to comprise circuitry configured to: access an entropy value for a second input data chunk of the plurality of input data chunks; and generate a stored block for the second input data chunk based on the entropy value for the second input data chunk and the entropy threshold.

Example 29 includes the subject matter of example 27, the accelerator device to comprise circuitry configured to: receive a second input data chunk of the plurality of input data chunks; and compress the second input data chunk based on the compression of the first input data chunk.

Example 30 includes the subject matter of example 29, wherein an entropy value for the second input data chunk exceeds the entropy threshold, wherein the entropy value for the first input data chunk is less than the entropy threshold.

Example 31 includes the subject matter of example 23, wherein the input data chunk, an indication of a lossless compression format, and the entropy threshold are to be received from an application, a virtual machine, or a microservice via one or more application programming interface (API) calls to a microservice of the accelerator device.

Example 32 includes the subject matter of example 31, the accelerator device to comprise circuitry configured to: return, to the application, the virtual machine, or the microservice, a response to indicate that the input data chunk was compressed or the stored block was generated.

Example 33 includes the subject matter of example 23, wherein the input data chunk is to comprise uncompressed data, wherein the circuitry to generate the stored block is to comprise circuitry to insert one or more headers into the input data chunk.

Example 34 includes an apparatus, comprising: means for accessing, by an accelerator device, an input data chunk to be compressed by the accelerator device; means for accessing, by the accelerator device, an entropy value for the input data chunk; and based on the entropy value and an entropy threshold, means for compressing the input data chunk by the accelerator device or means for returning an indication that the input data chunk will not be compressed by the accelerator device.

Example 35 includes the subject matter of example 34, wherein the entropy value is computed based on the input data chunk.

Example 36 includes the subject matter of example 34, wherein the entropy value is computed based on a predetermined subset of bits of the input data chunk.

Example 37 includes the subject matter of example 34, wherein a size of the input data chunk is based on a size of a buffer of the accelerator device.

Example 38 includes the subject matter of example 34, wherein the input data chunk is a first input data chunk of a plurality of input data chunks received from an application, a virtual machine, or a microservice, wherein the first input data chunk is compressed by the accelerator device based on the entropy value and the entropy threshold.

Example 39 includes the subject matter of example 38, further comprising: means for computing, by the accelerator device, an entropy value for a second input data chunk of the plurality of input data chunks; and means for generating, by the accelerator device, a stored block for the second input data chunk based on the entropy value for the second input data chunk and the entropy threshold.

Example 40 includes the subject matter of example 38, further comprising: means for receiving, by the accelerator device, a second input data chunk of the plurality of input data chunks; and means for compressing, by the accelerator device, the second input data chunk based on the compression of the first input data chunk.

Example 41 includes the subject matter of example 40, wherein an entropy value for the second input data chunk exceeds the entropy threshold, wherein the entropy value for the first input data chunk is less than the entropy threshold.

Example 42 includes the subject matter of example 34, wherein the input data chunk, an indication of a lossless compression format, and the entropy threshold are received from an application, a virtual machine, or a microservice via one or more application programming interface (API) calls to a microservice of the accelerator device.

Example 43 includes the subject matter of example 42, further comprising means for returning, to the application, the virtual machine, or the microservice, a response indicating that the input data chunk was compressed or the stored block was generated.

Example 44 includes the subject matter of example 34, wherein the input data chunk comprises uncompressed data, wherein generating the stored block comprises means for inserting one or more headers into the input data chunk.

Example 45 includes an apparatus comprising: a processor; and an accelerator device, the accelerator device to comprise circuitry configured to: access an input data chunk to be compressed by the accelerator device; compute an entropy value for the input data chunk; and compress the input data chunk or generate a stored block for the input data chunk based on the entropy value and an entropy threshold.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

What is claimed is:

1. An apparatus comprising:
a processor; and
an accelerator device, the accelerator device to comprise circuitry configured to:
access an input data chunk to be compressed by the accelerator device;
access an entropy value for the input data chunk;
compress the input data chunk or return an indication that the input data chunk will not be compressed based on the entropy value and an entropy threshold; and
generate a stored block for the input data chunk by inserting one or more headers into the input data chunk when the circuitry returns the indication that the input data chunk will not be compressed.

2. The apparatus of claim 1, wherein the circuitry to access the entropy value is to comprise one or more of: (i) circuitry to compute the entropy value based on the input data chunk, or (ii) circuitry to receive the entropy value from another source.

3. The apparatus of claim 1, wherein the entropy value is to be computed by the accelerator device based on a pre-determined subset of bits of the input data chunk.

4. The apparatus of claim 1, wherein a size of the input data chunk is to be based on a size of a buffer of the accelerator device.

5. The apparatus of claim 1, wherein the input data chunk is a first input data chunk of a plurality of input data chunks received from an application, a virtual machine, or a microservice, wherein the circuitry of the accelerator device is to compress the first input data chunk based on the entropy value and the entropy threshold.

6. The apparatus of claim 5, the accelerator device to comprise circuitry configured to:
compute an entropy value for a second input data chunk of the plurality of input data chunks; and
generate a stored block for the second input data chunk based on the entropy value for the second input data chunk and the entropy threshold.

7. The apparatus of claim 5, the accelerator device to comprise circuitry configured to:
receive a second input data chunk of the plurality of input data chunks; and
compress the second input data chunk based on the compression of the first input data chunk.

8. The apparatus of claim 7, wherein an entropy value for the second input data chunk exceeds the entropy threshold, wherein the entropy value for the first input data chunk is less than the entropy threshold.

9. The apparatus of claim 1, wherein the input data chunk, an indication of a lossless compression format, and the entropy threshold are to be received from an application, a virtual machine, or a microservice via one or more application programming interface (API) calls to a microservice of the accelerator device.

10. The apparatus of claim 9, the accelerator device to comprise circuitry configured to:

return, to the application, the virtual machine, or the microservice, a response to include one or more of: (i) an indication that the input data chunk was compressed, (ii) the indication that the input data chunk will not be compressed, or (iii) an indication that a stored block was generated based on the input data chunk.

11. The apparatus of claim 1, wherein the input data chunk is to comprise uncompressed data, wherein the circuitry returns the indication that the input data chunk will not be compressed.

12. A method, comprising:

accessing, by an accelerator device, an input data chunk to be compressed by the accelerator device;

accessing, by the accelerator device, an entropy value for the input data chunk;

compressing, by the accelerator device, the input data chunk or returning an indication that the input data chunk will not be compressed based on the entropy value and an entropy threshold; and generating, by the accelerator device, a stored block for the input data chunk by inserting one or more headers into the input data chunk when returning the indication that the input data chunk will not be compressed.

13. The method of claim 12, wherein accessing the entropy value comprises one or more of: (i) computing the entropy value by the accelerator device based on the input data chunk, or (ii) receiving, by the accelerator device, the entropy value from another source.

14. The method of claim 12, wherein the entropy value is computed by the accelerator based on a predetermined subset of bits of the input data chunk.

15. The method of claim 12, wherein a size of the input data chunk is based on a size of a buffer of the accelerator device.

16. The method of claim 12, wherein the input data chunk is a first input data chunk of a plurality of input data chunks received from an application, a virtual machine, or a microservice, wherein the first input data chunk is compressed by the accelerator device based on the entropy value and the entropy threshold.

17. The method of claim 16, further comprising:

computing, by the accelerator device, an entropy value for a second input data chunk of the plurality of input data chunks; and generating, by the accelerator device, a stored block for the second input data chunk based on the entropy value for the second input data chunk and the entropy threshold.

18. The method of claim 16, further comprising:

receiving, by the accelerator device, a second input data chunk of the plurality of input data chunks; and compressing, by the accelerator device, the second input data chunk based on the compression of the first input data chunk.

19. The method of claim 18, wherein an entropy value for the second input data chunk exceeds the entropy threshold, wherein the entropy value for the first input data chunk is less than the entropy threshold.

20. The method of claim 12, wherein the input data chunk, an indication of a lossless compression format, and the entropy threshold are received from an application, a virtual machine, or a microservice via one or more application programming interface (API) calls to a microservice of the accelerator device.

21. The method of claim 20, further comprising returning, to the application, the virtual machine, or the microservice, a response to include one or more of: (i) an indication that the input data chunk was compressed, (ii) the indication that the input data chunk will not be compressed, or (iii) an indication that a stored block was generated based on the input data chunk.

22. The method of claim 12, wherein the input data chunk comprises uncompressed data, wherein the indication that the input data chunk will not be compressed is returned.

23. An accelerator device, comprising:

an interface to a processor; and circuitry configured to:

access an input data chunk to be compressed by the accelerator device;

access an entropy value for the input data chunk;

compress the input data chunk or return an indication that the input data chunk will not be compressed based on the entropy value and an entropy threshold; and generate a stored block for the input data chunk by inserting one or more headers into the input data chunk when the circuitry returns the indication that the input data chunk will not be compressed.

24. The accelerator device of claim 23, wherein the circuitry to access the entropy value is to comprise one or more of: (i) circuitry to compute the entropy value based on the input data chunk, or (ii) circuitry to receive the entropy value from another source.

25. The accelerator device of claim 23, wherein the entropy value is to be computed by the circuitry based on a predetermined subset of bits of the input data chunk.

* * * * *